United States Patent
Zhang

(10) Patent No.: US 11,081,950 B2
(45) Date of Patent: Aug. 3, 2021

(54) LINEAR VIBRATION MOTOR

(71) Applicant: AAC Acoustic Technologies (Shenzhen) Co., Ltd., Shenzhen (CN)

(72) Inventor: Tao Zhang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 28 days.

(21) Appl. No.: 16/527,047

(22) Filed: Jul. 31, 2019

(65) Prior Publication Data

US 2020/0044546 A1 Feb. 6, 2020

(30) Foreign Application Priority Data

Aug. 3, 2018 (CN) .......................... 201821252571.4

(51) Int. Cl.
*H02K 33/18* (2006.01)
*B06B 1/04* (2006.01)
*H02K 33/14* (2006.01)
*H02K 35/00* (2006.01)

(52) U.S. Cl.
CPC .............. *H02K 33/18* (2013.01); *B06B 1/045* (2013.01); *H02K 33/14* (2013.01); *H02K 35/00* (2013.01)

(58) Field of Classification Search
CPC ........ H02K 33/18; H02K 33/14; H02K 33/02; H02K 35/00; H02K 33/00; H02K 33/10; B06B 1/045
USPC ................. 310/15, 17, 21, 23, 25, 28, 26, 27
See application file for complete search history.

(56) References Cited

U.S. PATENT DOCUMENTS

| | | | | |
|---|---|---|---|---|
| 8,288,899 | B2* | 10/2012 | Park | H02K 33/16 |
| | | | | 310/25 |
| 10,639,673 | B2* | 5/2020 | Lee | B06B 1/045 |
| 2011/0012441 | A1* | 1/2011 | Oh | H02K 33/16 |
| | | | | 310/25 |
| 2011/0018365 | A1* | 1/2011 | Kim | B06B 1/045 |
| | | | | 310/17 |
| 2012/0227269 | A1* | 9/2012 | Subramanian | H02K 33/06 |
| | | | | 30/210 |
| 2015/0349619 | A1* | 12/2015 | Degner | H02K 41/0356 |
| | | | | 310/12.21 |

* cited by examiner

*Primary Examiner* — Ahmed Elnakib
(74) *Attorney, Agent, or Firm* — W&G Law Group LLP

(57) ABSTRACT

Provided is a linear vibration motor, including: a housing having a receiving space; a vibration unit received in the receiving space; an elastic assembly configured to suspend the vibration unit in the receiving space, and a driving unit fixed to the housing and configured to drive the vibration unit to vibrate. The linear vibration motor includes a coil assembly and two first permanent magnets respectively provided at two sides of the coil assembly. The vibration unit includes one of the coil assembly and the first permanent magnets, and the driving unit includes the other one. When the vibration unit is static, a central axis of the first permanent magnet perpendicular to a vibrating direction of the vibration unit and a central axis of the coil assembly perpendicular to the vibrating direction of the vibration unit are spaced apart from each other in the vibrating direction of the vibration unit.

6 Claims, 5 Drawing Sheets

LINEAR VIBRATION MOTOR

TECHNICAL FIELD

The present disclosure relates to the field of electric-acoustic conversion technologies, and in particular, to a linear vibration motor.

BACKGROUND

With development of the electronic technology, portable consumer electronic products, such as mobile phones, hand-held game machines, navigation devices and hand-held multimedia entertainment devices, are becoming more and more popular. In these electronic products, vibration motors are generally used for system feedback, such as call notification of the mobile phone, message notification, navigation notification and vibration feedback of the game machine.

A linear vibration motor in the related art includes a housing having a receiving space, a vibration unit received in the receiving space, an elastic assembly for suspending the vibration unit in the receiving space, and a driving unit driving the vibration unit to vibrate and fixed to the housing. One of the vibration unit and the driving unit includes a coil; and the other of the vibration unit and the driving unit includes a magnet symmetrically provided with respect to the coil.

However, in the linear vibration motor of the related art, with such a design, the system stiffness is low and the electromagnetic utilization efficiency is low due to influence of the negative stiffness generated by the electromagnetic attraction.

Therefore, it is necessary to provide a new linear vibration motor to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Embodiment 1

Figure 1:
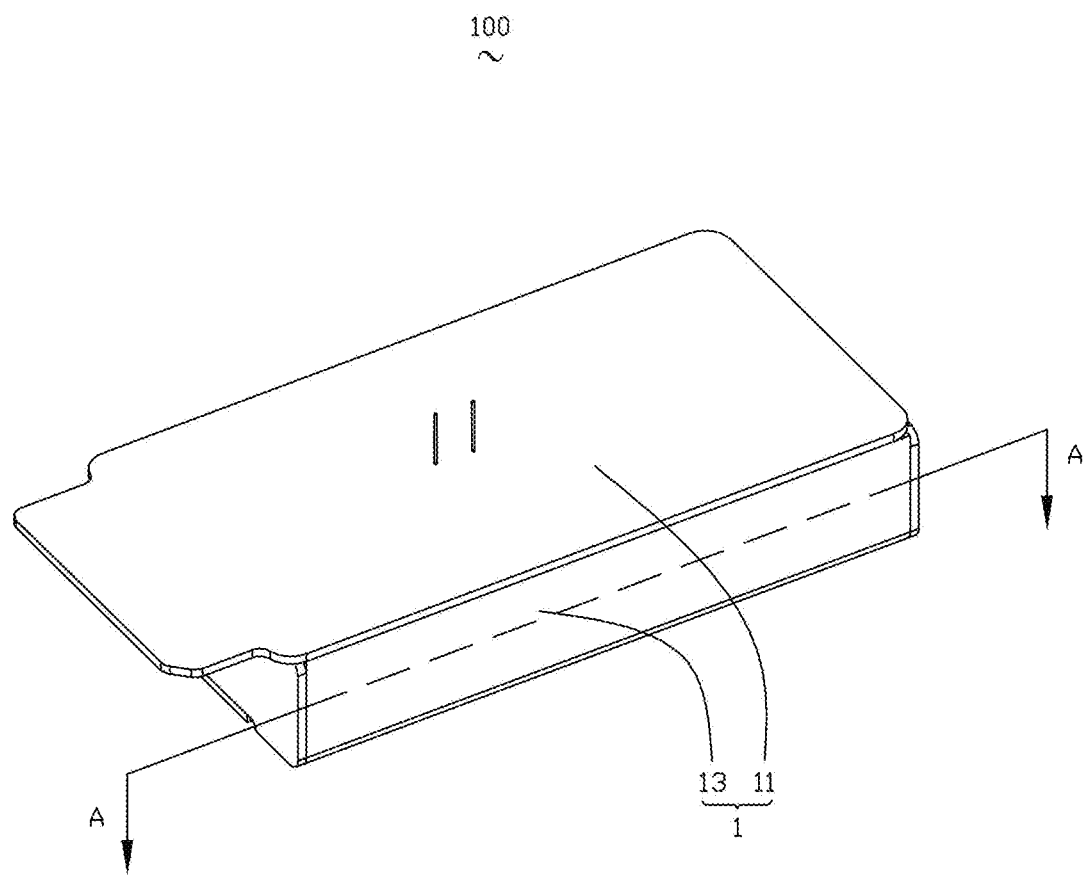
FIG. 1 is a perspective schematic structural view of a linear vibration motor according to Embodiment 1 of the present disclosure.
Figure 2:
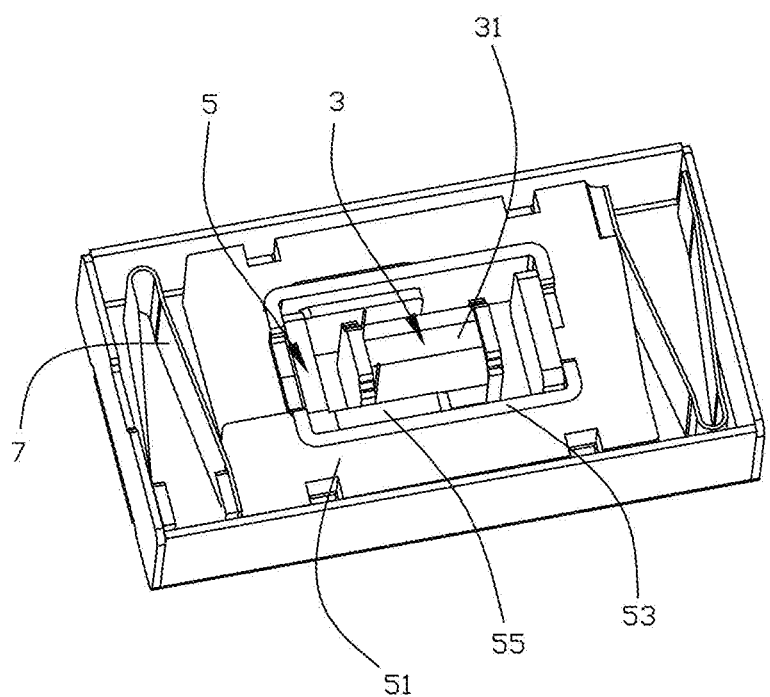
FIG. 2 is a perspective schematic structural view of the linear vibration motor shown in FIG. 1 after its upper cover is removed.

Referring to FIGS. 1 and 2, the linear vibration motor 100 includes a housing 1 having a receiving space; a vibration unit 5 received in the receiving space; an elastic assembly 7 configured to suspend the vibration unit 5 in the receiving space; and a driving unit 3 fixed to the housing 1 and configured to drive the vibration unit 5 to vibrate. The linear vibration motor 100 includes a coil assembly 31; and two first permanent magnets 55 provided on two sides of the coil assembly 31 respectively. The vibration unit 5 includes the first permanent magnets 55, and the driving unit 3 includes the coil assembly 31. In other embodiments, the vibration unit 5 include the coil assembly 31, and the driving unit 3 includes the first permanent magnets 55.

When the vibration unit 5 is static, a central axis of the first permanent magnet 55 perpendicular to a vibrating direction of the vibration unit 5 and a central axis of the coil assembly 31 perpendicular to the vibrating direction of the vibration unit 5 are spaced apart from each other in the vibrating direction of the vibration unit 5.

With such design, the first permanent magnet 55 and the coil assembly 31 are asymmetry in the vibrating direction, thereby avoiding a situation in which the larger the displacement is, the lower the system stiffness is. In view of this, the magnetic field circulation in the entire magnetic circuit is more compact, and the efficiency of electromagnetic utilization is improved.

The housing 1 includes an upper cover 11 and a lower cover 13. The lower cover 13 is assembled with the upper cover 11 to form the receiving space.

Figure 3:
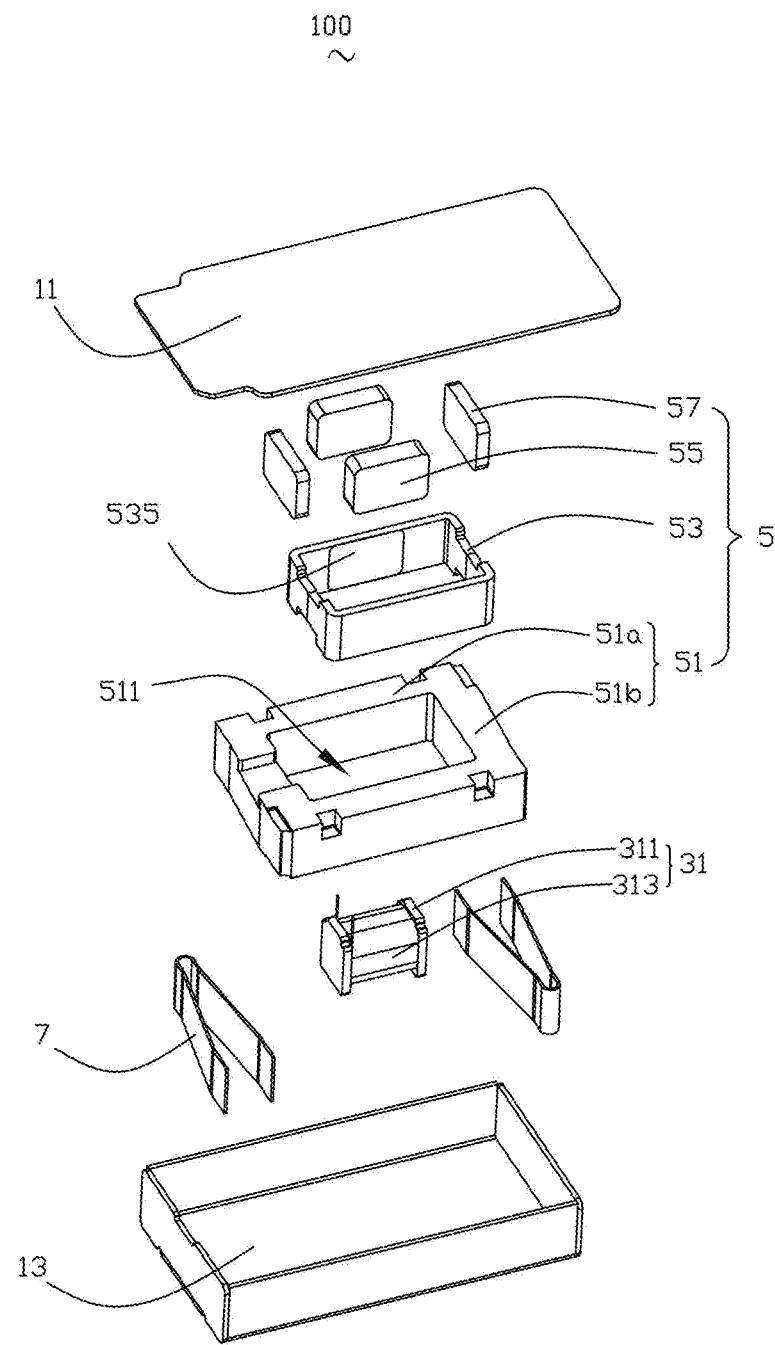
FIG. 3 is a perspective exploded schematic structural view of the linear vibration motor shown in FIG. 1.
Figure 4:
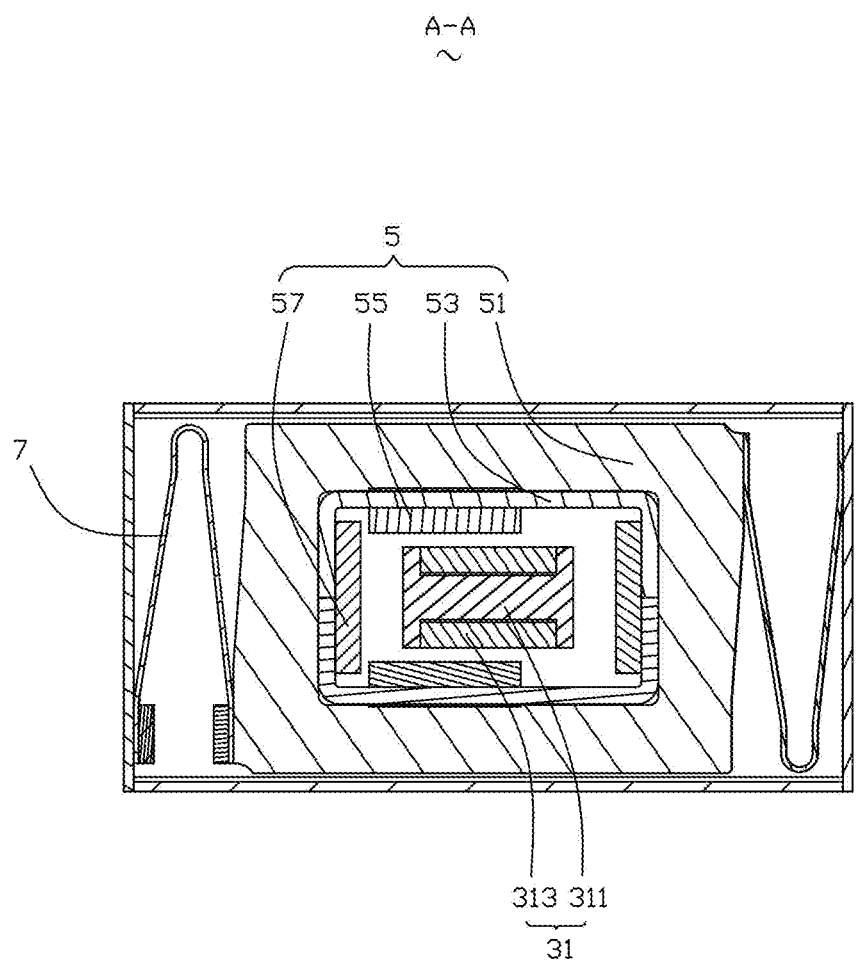
FIG. 4 is a cross-sectional view of the linear vibration motor shown in FIG. 1 taken along line A-A.

Referring to FIGS. 3 and 4, the coil assembly 31 includes an iron core 311 and a coil 313 wound around the iron core 311. A lead terminal of the coil 313 passes out of the housing 1 for connection with an external circuit.

The vibration unit 5 includes a weight 51 having a hollow structure 511, and a first permanent magnet 55 and a second permanent magnet 57 assembled in the hollow structure 511. The coil assembly 31 is inserted into the hollow structure 511.

In an example, the hollow structure 511 has a rectangular cross section.

The weight 51 includes two long walls 51a provided opposite to each other in the vibrating direction of the vibration unit 5, and two short walls 51b respectively connecting the two long walls 51a. Two first permanent magnets 55 are respectively mounted and fixed to the two long walls 51a. The first permanent magnets 55 have different distances to the two short walls 51b. When the vibration unit 5 is static, the coil assembly 31 is located at the center of the hollow structure 511 and has a same distance to the two short walls 51b. That is, the first permanent magnet 55 and the coil assembly 31 are asymmetrically provided in the vibrating direction.

The vibration unit 5 further includes a fixing member 53 for fixing the first permanent magnet 55 and the second permanent magnet 57. The fixing member 53 is fixed to a surface of the weight 51 facing towards the hollow structure 511. The first permanent magnet 55 and the second permanent magnet 57 are fixed to a surface of the fixing member 53 facing away from the weight 51.

Optionally, the fixing member 53 is provided with a receiving groove 535 corresponding to a position where the first permanent magnet 55 is fixed. The two first permanent magnets 55 are respectively embedded in the two receiving grooves 535 of the fixing member 53.

Two second permanent magnets 57 are respectively mounted and fixed to the two short walls 51b.

Two elastic assemblies 7 are provided. The two elastic assemblies 7 are respectively provided at two ends of the vibration unit 5 in the vibrating direction of the vibration unit 5.

Embodiment 2

Figure 5:
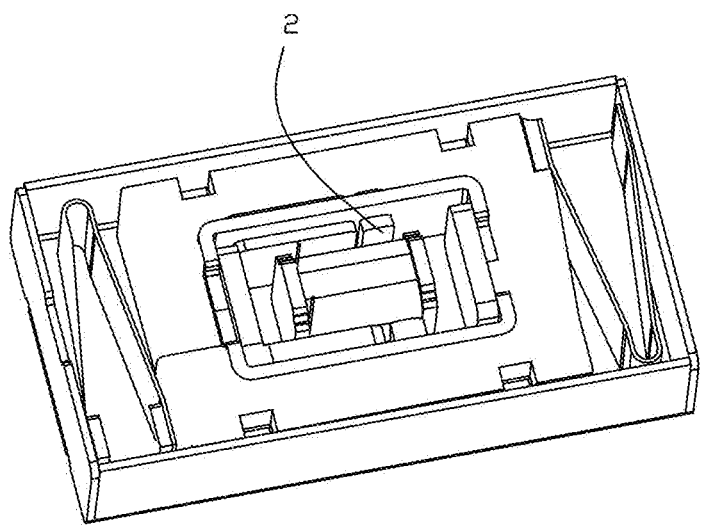
FIG. 5 is a partial schematic structural view of a linear vibration motor according to Embodiment 2 of the present disclosure.

Referring to FIG. 5, the structure of the linear vibration motor provided in this embodiment is basically same as that of the linear vibration motor 100 provided in Embodiment 1, and the difference lies in the structure of the vibration unit.

In this embodiment, the vibration unit further includes two third permanent magnets 2 respectively provided at two sides of the coil assembly provided with the first permanent magnets. The third permanent magnet 2 is spaced apart from the first permanent magnet. The third permanent magnet 2 is provided at an end of the first permanent magnet close to a central axis of the coil assembly that is perpendicular to the vibrating direction of the vibration unit. The third permanent magnet 2 has an opposite polarity with the first permanent magnet.

In an example, the third permanent magnet 2 can also be embedded in the fixing member. By providing the third permanent magnet 2, the magnetic field is made more stable.

Compared with the related art, with the linear vibration motor provided by the present disclosure, when the vibration unit is static, the asymmetry design between the first permanent magnet 55 and the coil assembly 31 in the vibrating direction can avoid the situation in which the larger the displacement is, the lower the system stiffness is. Therefore, the magnetic field circulation in the entire magnetic circuit is more compact, and the efficiency of electromagnetic utilization is improved. By providing the third permanent magnet, the magnetic field is made more stable.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A linear vibration motor, comprising:
   a housing having a receiving space;
   a vibration unit received in the receiving space;
   an elastic assembly configured to suspend the vibration unit in the receiving space, and
   a driving unit fixed to the housing and configured to drive the vibration unit to vibrate,
   wherein the linear vibration motor comprises a coil assembly and two first permanent magnets respectively provided at two sides of the coil assembly; the vibration unit comprises one of the coil assembly and the first permanent magnets, and the driving unit comprises the other one of the coil assembly and the first permanent magnets; when the vibration unit is static, a central axis of the first permanent magnet perpendicular to a vibrating direction of the vibration unit and a central axis of the coil assembly perpendicular to the vibrating direction of the vibration unit are spaced apart from each other in the vibrating direction of the vibration unit;
   the driving unit comprises a coil assembly comprising an iron core and a coil wound around the iron core; the vibration unit comprises a weight having a hollow structure and the two first permanent magnets assembled in the hollow structure, and the coil assembly is inserted into the hollow structure;
   the weight comprises two long walls and two short walls; the two long walls are provided opposite to each other along the vibrating direction of the vibration unit; the two short walls are respectively connected to the two long walls; the long wall and the short wall are connected to form the hollow structure; and the two first permanent magnets are respectively mounted and fixed to the two long walls and have different distances to the two short walls;
   the vibration unit further comprises second permanent magnets mounted and fixed to the two short walls.

2. The linear vibration motor as described in claim 1, wherein the vibration unit further comprises a fixing member for fixing the two first permanent magnets and the second permanent magnets, the fixing member is fixed to a surface of the weight facing towards the hollow structure, and the two first permanent magnets and the second permanent magnets are fixed to a surface of the fixing member facing away from the weight.

3. The linear vibration motor as described in claim 2, wherein the fixing member is provided with receiving grooves, and the two first permanent magnets are respectively embedded in the receiving grooves.

4. The linear vibration motor as described in claim 1, wherein the vibration unit further comprises two third permanent magnets respectively provided on two sides of the coil assembly that are provided with the first permanent magnets, the third permanent magnets are spaced apart from the first permanent magnets, each of the third permanent magnets is provided at an end of one of the first permanent magnet close to the central axis of the coil assembly perpendicular to the vibrating direction of the vibration unit, and each of the third permanent magnets has an opposite polarity with the first permanent magnets.

5. The linear vibration motor as described in claim 4, wherein the third permanent magnets are embedded in the fixing member.

6. The linear vibration motor as described in claim 1, wherein two elastic assemblies are provided, and the two elastic assemblies are respectively provided on two ends of the vibration unit in the vibrating direction of the vibration unit.

* * * * *